United States Patent
Beckham

(10) Patent No.: US 7,434,757 B2
(45) Date of Patent: Oct. 14, 2008

(54) ZERO-BACKLASH BAITCAST FISHING REEL

(76) Inventor: James P. Beckham, 218 Colonial Cir., Athens, TX (US) 75751

( * ) Notice: Subject to any disclaimer, the term of this patent is extended or adjusted under 35 U.S.C. 154(b) by 0 days.

(21) Appl. No.: 11/881,066

(22) Filed: Jul. 25, 2007

(65) Prior Publication Data

US 2008/0017739 A1 Jan. 24, 2008

Related U.S. Application Data

(63) Continuation of application No. PCT/US2006/003115, filed on Jan. 26, 2006.

(60) Provisional application No. 60/647,091, filed on Jan. 26, 2005.

(51) Int. Cl.
*A01K 89/01* (2006.01)

(52) U.S. Cl. .................. 242/223; 242/305; 242/323; 73/597; 73/598

(58) Field of Classification Search .......... 242/223, 242/305, 323; 73/597, 598
See application file for complete search history.

(56) References Cited

U.S. PATENT DOCUMENTS

| | | | |
|---|---|---|---|
| 2,205,641 A | 6/1940 | Wilson | |
| 4,142,694 A | 3/1979 | Rankin, Jr. | |
| 4,196,871 A | 4/1980 | Kobayashi | |
| 4,402,470 A | 9/1983 | Hamayasu | |
| 4,549,703 A | 10/1985 | Atobe | |
| 4,585,183 A | 4/1986 | Puryear | |
| 4,674,699 A | 6/1987 | Fukushima et al. | |
| 4,733,831 A | 3/1988 | Runyon | |
| 4,821,975 A | 4/1989 | Uetsuki et al. | |
| D321,925 S | 11/1991 | Shiman et al. | |
| 5,289,992 A | 3/1994 | Du Plessis et al. | |
| 5,318,245 A | 6/1994 | Sato et al. | |
| 5,577,679 A | 11/1996 | Thomas | |
| 5,749,533 A | 5/1998 | Daniels | |
| 5,826,472 A * | 10/1998 | Tamura et al. | 83/72 |
| 5,833,156 A | 11/1998 | Park et al. | |
| 6,032,891 A * | 3/2000 | Chang | 242/223 |
| 6,045,076 A | 4/2000 | Daniels | |
| 6,086,005 A | 7/2000 | Kobayashi et al. | |
| 6,109,555 A | 8/2000 | Svenson et al. | |
| 6,126,105 A | 10/2000 | Yamaguchi | |
| 6,206,311 B1 | 3/2001 | Kim et al. | |
| 6,253,461 B1 * | 7/2001 | Fischer | 33/762 |
| 6,412,722 B1 | 7/2002 | Kreuser et al. | |
| 6,561,033 B2 * | 5/2003 | Nanbu et al. | 73/597 |
| 6,851,636 B2 * | 2/2005 | Nanbu | 242/223 |
| 7,103,988 B2 * | 9/2006 | Sanoner | 33/763 |
| 7,159,851 B1 * | 1/2007 | Ross et al. | 254/275 |

* cited by examiner

*Primary Examiner*—Emmanuel M Marcelo
(74) *Attorney, Agent, or Firm*—Jacqueline S. Larson

(57) ABSTRACT

A fishing reel directly measuring line travel (not velocity or acceleration) past two or more points along the line, with said data being fed back in real time to a comparative control loop which initiates a direct contact spool brake to slow or near-instantaneously halt spool rotation in order to maximize casting distance while eliminating backlash under all casting conditions. During the cast, the line length fed from the spool is prevented from exceeding (to the point of backlash) the line length being pulled out from the spool. During a cast in which the lure is suddenly halted (as in the case of the lure striking a structure or object), the system senses control instability and fully halts the spool rotation so that backlash is prevented.

12 Claims, 2 Drawing Sheets

ZERO-BACKLASH BAITCAST FISHING REEL

This application is a continuation of International Patent Appln. No. PCT/US2006/003115, filed Jan. 26, 2006 and designating the United States, and claims benefit of U.S. Provisional patent application Ser. No. 60/647,091, filed Jan. 26, 2005, the entire disclosures of which are incorporated herein by reference.

FIELD OF THE INVENTION

The present invention relates to a baitcast fishing reel, which is a fishing reel of the type having a spool mounted on a shaft or journal that rotates as line is paid out during the cast, and more particularly this invention is directed to the prevention of backlash in a baitcast fishing reel, while maximizing casting distance.

BACKGROUND OF THE INVENTION

The baitcast reel is used widely but has an inherent shortcoming called backlash, which numerous patents have attempted to address. Backlash occurs when the reel spool overruns the outgoing line, causing the line to be caught and pulled back under the rotating spool, resulting in a knotted tangle of line. Said another way, backlash happens when the length of line being paid out by the spool exceeds the length of line being pulled away from the spool.

Prior art has addressed this deficiency in three primary ways:

1. Braking Without Direct Feedback (Magnetic, Electrical, Mechanical, Centrifugal.) (see, e.g., U.S. Pat. Nos. 321,925; 4,142,694; 4,549,703; 4,585,183; 4,674,699; 4,733,831; 4,821,975; 5,318,245; 6,086,005; 6,126,105; 6,206,311; 6,412,722).

This approach addresses the backlash problem by slowing the rotation of the reel. This is done irrespective of the actual outgoing line velocity, with a major drawback being that it effectively reduces casting distance. In spite of this braking, and regardless of the manner of its application, backlash still occurs regularly with reels employing this design. Braking of this sort is marginally effective overall only if the user of the reel customizes his casting speed and style, and also makes manual brake settings adjustments. Usually, manual "thumbing" of the reel spool is further required to eliminate backlash. In addition, changes from cast to cast in wind conditions, lure weights and lure wind profiles require continuous manual changes by the reel user to minimize backlash.

All reels currently on the market that claim to address the problem of backlash utilize some variation on braking without direct feedback, and all only marginally minimize backlash.

2. Braking with Line Tension Feedback (see, e.g., U.S. Pat. Nos. 2,205,641; 4,196,871; 5,289,992; 5,749,533; 6,045,076; 6,109,555)

In theory, this approach is much more effective than braking without any line condition feedback. In practice, this method fails to eliminate the problem. Its weakness lies in the fact that extremely small changes in line tension can be indicative of very large differences in line/spool speeds. Thus it has proven very difficult to measure line tension to the level of precision required for minute feedback changes. In addition, the line tension is inherently prone to variation from factors other than outgoing line velocity. These variables include wind conditions, line friction in the rod guides, line conditions (wet, dry), line stiffness, temperature, etc. In spite of prior art dating from 1943, because of these shortcomings no reel currently on the market utilizes any form of line tension feedback.

3. Braking with Line Acceleration or Velocity Feedback

Park U.S. Pat. No. 5,833,156, Hamayasu U.S. Pat. No. 4,402,470 and Thomas U.S. Pat. No. 5,577,679 all employ some form of line acceleration or velocity feedback.

Park's primary embodiment utilizes an accelerometer attached to the line near the lure, which feeds back accelerations over time through an optical fiber in the fishing line. This data is mathematically integrated to obtain a velocity, which is compared to the spool velocity. This approach requires the complexity of a special device attached to the fishing line, as well as a special data-transferring fishing line. In addition, it measures acceleration, not velocity directly.

Thomas relies on "detectable" material in the fishing line to obtain line velocity. The drawback of this approach lies in the necessity of having available a fishing line with optic, magnetic or radioactive properties which can be sensed or detected.

Hamayasu, similarly, relies on the line having optical or magnetic properties so that photosensitive or magnetically sensitive sensors can be used to calculate outgoing line velocity.

These three patents all require a special fishing line to achieve the line velocity feedback. In addition, most prior art reels, as well as the only reel currently on the market claiming to minimize (although not prevent) backlash, the Shimano Calcutta TE/DC™, use a form of velocity feedback; that is, they measure speed rather than distance, which is inherently problematic. Velocity or acceleration is by definition a measurement over an interval of time, and the critical time interval for backlash is very small. Backlash can occur in a fraction of a second, even within the first ¼ of a second of the cast, and a speed measurement cannot yield the precise data needed to make changes 1000 times per second, since it is inherently an averaged unit. A scalar measurement at a discrete point in time would be more suitable to accurately represent the system behavior.

All prior art baitcast reels have a manual adjusting device that mechanically brakes the spool to help eliminate backlash. This brake is usually applied to the end of the spool spindle, and it impedes the rotation of the spool throughout the cast, reducing the chance of backlash by limiting the initial spool velocity and greatly reducing casting distance. Many reels call it a "cast control knob" or a "cast control cap". Backlash would be severe in any of these reels without this adjusting device, which adds weight, complexity and cost to the reels.

So the object of eliminating backlash remains unsatisfactorily addressed by the prior art and by the marketplace.

SUMMARY OF THE INVENTION

The present invention comprises a fishing reel that eliminates backlash and maximizes casting distance within the reel itself by utilization of direct measurement of line travel, direct and real-time feedback control, and direct contact spool braking, and without requiring the use of a manual mechanical brake adjusting device or of fishing line with special properties. The fishing reel directly measures line travel (not velocity or acceleration) past two or more points along the line, with said data being fed back in real time to a comparative control loop which initiates a direct contact spool brake to slow or near-instantaneously halt spool rotation in order to maximize casting distance while eliminating backlash under all casting conditions. During the cast, the line length fed from the spool is prevented from exceeding (to the point of backlash) the line length being pulled out from the spool. During a cast in which the lure is suddenly halted (as in the case of the lure striking a structure or object), the system senses control instability and fully halts the spool rotation so that backlash is prevented.

More particularly, the invention is directed to a baitcast fishing reel comprising a spool with fishing line; a spool sensor in contact with the fishing line on the spool and comprising a first line contact point and a first encoder system that directly measures the length of the fishing line passing the first line contact point; a line sensor located away from the spool and comprising a second line contact point and a second encoder system that directly measures the length of fishing line passing the second line contact point; a system controller that receives and compares the measurements from the first and second encoder systems and provides a control voltage to a brake actuator; a spool braking mechanism for directly applying resistance against the free rotation of the spool; and a brake actuator responsive to the control voltage from the system controller to actuate the spool braking mechanism when the length of fishing line passing the first line contact point exceeds the length of fishing line passing the second line contact point.

The invention is further directed to a method for decreasing or substantially eliminating backlash of fishing line when casting, the method comprising utilizing the fishing reel of the present invention to directly measure the length of fishing line traveled and directly feeding the information to a spool brake in direct contact with the spool.

This invention substantially eliminates backlash and maximizes casting distance by directly measuring the length of line that has moved past a point at the spool, then comparing it to a direct measurement of the length of line that has moved past a point at a short distance from the spool. The measurement of the length of moving line is irrespective of and independent of the speed or velocity of either the spool or the line being drawn out of the spool. The fishing line length data is fed back at about 1 kHz to a programmable microcontroller that outputs a voltage to actuate the spool braking mechanism. In doing so, the length of line that is paid out from the spool is controlled throughout the cast at a length that is at or slightly below the length of line that is being pulled away from the spool, thereby substantially completely eliminating backlash while maximizing the casting distance.

The line length measurement is accomplished by sensors that are integral to the reel and that sense line passage at each point regardless of the line type or condition, and which are independent of magnetic, optical, radioactive or other properties of the line. Additionally, the reel of the present invention eliminates the need for a manual adjusting device that mechanically brakes the spool. In contrast to prior art reels, backlash is not simply minimized but is substantially eliminated with the baitcast fishing reel of the present invention.

DETAILED DESCRIPTION OF THE INVENTION AND PREFERRED EMBODIMENTS

Figure 1:
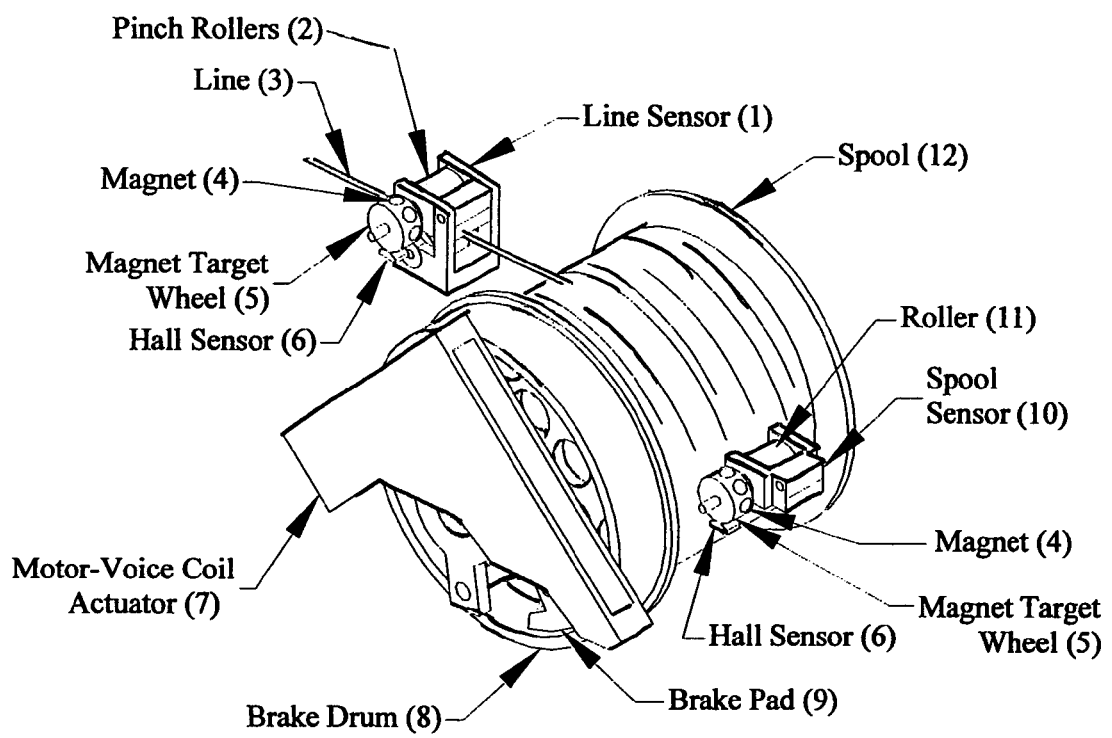
FIG. 1 is a diagram of the key components of one embodiment of the invention.

As used herein and in the appended claims, "a" and "an" mean one or more, unless otherwise clearly indicated.

By "substantially eliminating backlash" is meant that the amount of backlash, if any, generated by the fishing reel is so small that it is not detected by the operator during the normal course of casting and reeling.

By "away from the spool" is meant a location from the tangent point of the fishing line as it leaves the spool distally toward the end of the fishing rod. Note that the point of measurement can be out to but not past the tip of the fishing rod itself. However, as the point of measurement moves further from the spool, the effectiveness of the measure is reduced. In a presently preferred embodiment, the location is a short distance from the spool (that is, from about 0.25 in to about 5 in, preferably from about 0.25 in to about 2 in from the spool), and more preferably the location is on the level wind guide of the reel.

The zero-backlash fishing reel of this invention substantially eliminates backlash and maximizes casting distance by directly measuring the length of line that has moved past a point at the spool, then comparing it to a direct measurement of the length of line that has moved past a point located away from the spool, preferably at a short distance from the spool. A line length measurement system directly measures the length of fishing line moving past the line contact point. The two line length measurement systems are the spool sensor and the line sensor. The spool sensor comprises i) a first line contact point that is positioned to be in contact with the fishing line on the spool and ii) a first encoder system that directly measures the length of the fishing line as it moves during the spool's rotation over a pre-determined period of time. The line sensor comprises i) a second line contact point that is positioned shortly away from the spool and ii) a second encoder system that directly measures the length of the line as it moves past the second contact point as the line is cast.

In a presently preferred embodiment of the invention, the first and/or second line contact points comprise one or more rollers. More preferably, the rollers are rubber or rubber elastomer and they are in direct contact with the fishing line. Alternatively, the first and/or second line contact points comprise a roller system that may be a series of pulleys or rollers over which the fishing line is threaded. In a third embodiment, the fishing line may wrap several times around a single roller, possibly in conjunction with other rollers.

In the preferred embodiment, the line sensor comprises two rubber rollers as its line contact point, which rollers are configured in a pinch roller configuration with the fishing line running between them. Also in the preferred embodiment, the spool sensor comprises a single rubber roller as its line contact point, which roller is held by spring force against the fishing line on the spool.

The first and second encoder systems may be optical, mechanical, magnetic, and the like, and include systems known in the art for directly measuring movement and forwarding that information to a system controller. The data from the encoders is processed by the control logic as linear distance, not velocity. In a presently preferred embodiment, the encoder systems directly measure a defined length of fishing line that goes past the line contact point. In the more preferred embodiment, the encoder systems comprise a magnet target wheel, which delineates each finite increment of fishing line that passes the line contact point, and a Hall effect sensor that senses the magnet pole changes as the target wheel rotates, translates the changes into corresponding voltage pulses (the signal), and relays the voltage pulses (signal) to the system controller.

In another embodiment, the line length could be measured by a non-contact sensor that is able to detect movement of all conventional fishing lines by optical, laser, magnetic, chemical, nanomechanical or other means and to transmit the signal in the form of current, pressure, mechanical, optical, chemical, molecular, nanomechanical, or quantum, for example.

The fishing reel of the invention further utilizes a system controller to receive and compare the measurements from the first and second encoder systems. It outputs a voltage (the control voltage) to a brake actuator that actuates a spool braking mechanism attached to the spool. The brake directly applies resistance against the free rotation of the spool to slow or stop the rotation and prevent backlash from occurring.

In an alternate embodiment, the system controller can be mechanical or electrical, with or without a programmable microcontroller chip.

The spool braking mechanism is a mechanical system and is in direct contact with the spool. This type of brake is in contrast to some braking mechanisms in the prior art, which utilize magnets or electromagnets to apply a non-contact braking force. The brake of the present invention can apply very light force, thereby finely controlling spool braking, or apply full and immediate force, thereby completely halting and locking spool rotation. The aforementioned prior art electromotive or regenerative brake cannot halt and lock spool rotation, and as a result cannot prevent backlash under all casting conditions. In the presently preferred embodiment, the spool braking mechanism is a drum-style brake that is actuated by a rotary voice coil actuator.

In an alternate embodiment, braking of the spool can be accomplished via one or more mechanisms, such as but not limited to, disc type brake with brake calibers, inertial braking, magnetic braking, cone brake, and any combination of these.

In an alternate embodiment, other types of actuators could be used to actuate the brake. Actuator types would include piezoactuator, piezomotor, servo, stepper, solenoid, pneumatic, hydraulic, electric, and the like.

Referring to FIG. 1, the spool 12 and fishing line 3 of the reel are selected from those normally used in baitcast fishing reels. The line sensor 1 is comprised of a pair of opposing rollers 2 set up in a pinch roller configuration through which the line 3 is fed. The roller system has a very small rolling inertia so that line travel through it is not significantly impeded. The roller system may be incorporated into the level-wind guide that is common to most baitcast reels. A magnetic target wheel 5 is attached to one shaft of the roller system such that when the roller turns as a result of line contact, the target wheel also turns. Small magnets 4 are arrayed around the rim of the target wheel in an alternating north/south/north/south configuration. Each incremental turn of the target wheel from one pole to the next represents an increment of line past the contact point on the roller 2. With a roller diameter of X (for example, 0.25 in) and a target wheel having Y (for example, 8) targets, the length of line from one pole to the next (translated into one voltage pulse by the Hall sensor) is [Pi*X]/Y (or, in our example, [Pi*0.25]/8). A Hall Effect sensor 6 is positioned at the target wheel such that the magnets actuate the sensor as the target wheel rotates. The Hall sensor (Honeywell SS466A) sends a voltage pulse each time a magnetic pole change is sensed. This Hall sensor/magnet target wheel system comprises the encoder system. These voltage pulses are counted by the control chip of the system controller for continuous comparison to the pulse count from the spool sensor 10. This comparison is used in the computer control loop to determine the amount of braking force necessary to apply to the spool brake drum 8 to keep the pulse count difference near zero.

The spool sensor 10 is comprised of a single roller 11 held by spring force against the line 3 that is wound onto the spool 12. As the spool turns, the line in contact with the roller 11 causes the roller to turn. A magnetic target wheel 4, similar to that in the line sensor 1, is attached to the shaft of the roller such that when the roller turns as a result of line contact, the target wheel also turns. In the same way as the line sensor 1, a Hall Effect sensor 6 (Honeywell SS466A) counts the alternating magnet 4 pole changes and sends corresponding voltage pulses to the system controller. As with the line sensor, each pulse represents a small length of line passing the contact point of the roller. This is a measurement of line length, not velocity.

The spool braking mechanism is a drum-style brake system. The brake drum 8 is affixed to the shaft of the spool 12, such that an impeding force applied to the drum will directly impede the spool rotation. A composite cork brake pad 9 is actuated by the brake motor (brake actuator) 7, and is configured so that it can lightly or very firmly brake the drum rotation. The brake actuator arm (not shown) is sized to optimize braking force while maintaining a sufficient brake stroke length.

The brake motor is a rotary voice coil actuator 7. This type of VCA is commonly used in computer hard drives. While other brake motors known to those skilled in the art may be used in the invention, the VCA is preferable for its extremely fast response times, which are desirable in a system that can go unstable (backlash) in a fraction of a second. The motor 7 of the current invention was taken from a 3.5 inch hard drive. It can produce a torque of 1.23 oz-inch at 9V. When the brake pad 9 moves to contact the drum 8, it impedes the rotation of the drum/spool assembly. As the voltage is increased, the force of the brake pad against the drum increases correspondingly.

This type of brake is in contrast to some braking mechanisms in the prior art, which utilize magnets or electromagnets to apply a non-contact braking force. The brake of the present invention can apply very light force, thereby finely controlling spool braking, or apply full and immediate force, thereby completely halting and locking spool rotation. The aforementioned electromotive or regenerative brake cannot halt and lock spool rotation, and as a result cannot prevent backlash under all casting conditions.

Figure 2:
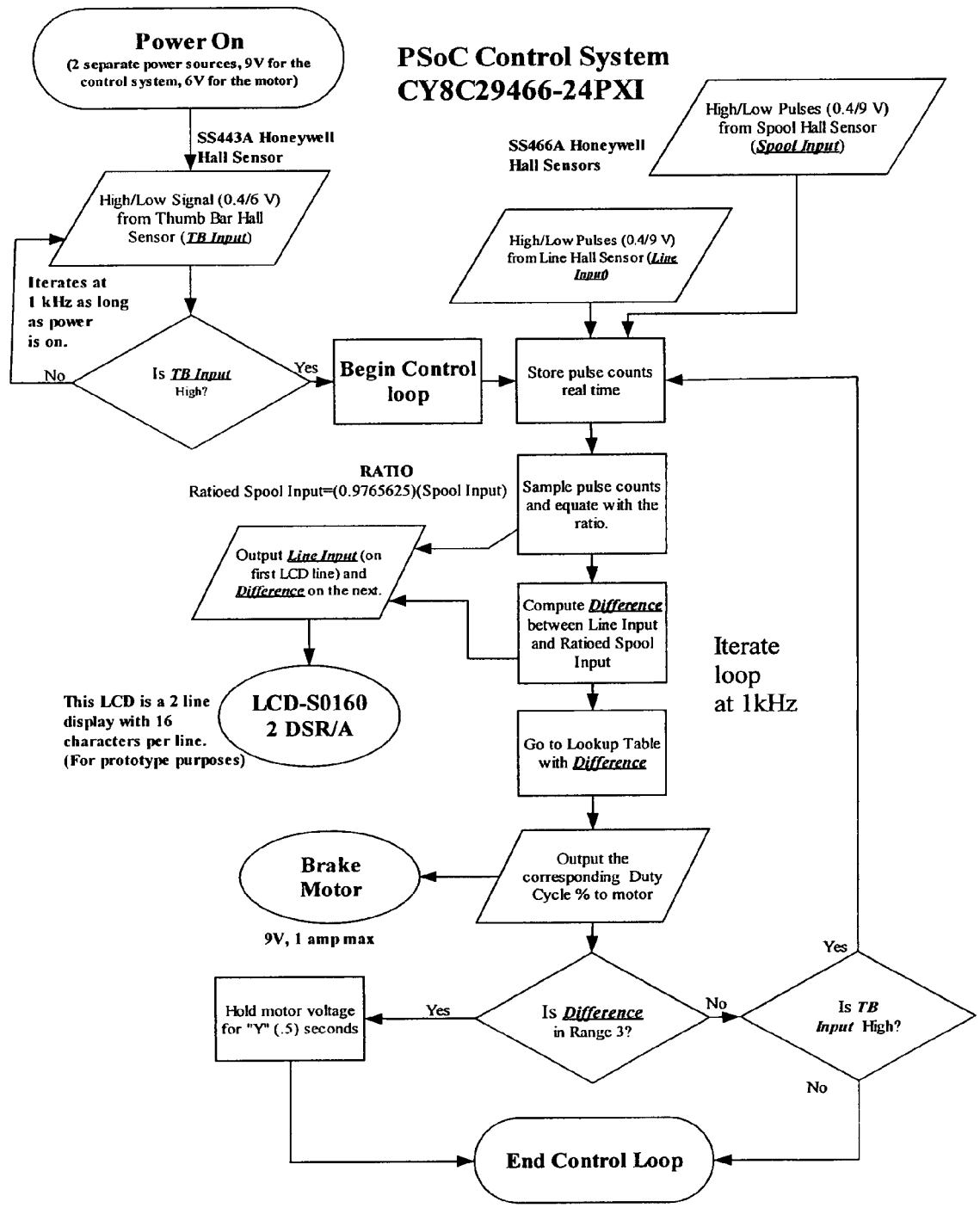
FIG. 2 is a flow chart of the control logic, as programmed on the controller chip in the embodiment illustrated in FIG. 1 and described herein.

Referring to FIG. 2, the system controller is comprised of a control chip (Cypress Semiconductors PSoC CY8C29466-24PXI) which receives the input at about 1 kHz from the Hall sensors 6. A C++ program that is downloaded to the chip performs logic and math operations, resulting in control of the system to eliminate backlash while maximizing cast distance. When the thumb bar (not shown) is depressed, a magnet is moved to a third Hall effect sensor (Honeywell SS443A, not shown) which sends a voltage that initiates the start of the control loop. The program performs a ratioing function on the input from the "Line Sensor" and "Spool Sensor" so that they can be compared. After the ratio operation is done, a pulse count of "1" from the "Line Sensor" represents the same length of line passage as a pulse count of "1" from the "Spool Sensor". As the pulse count differs between the two sensors during the cast, a proportional voltage is applied to the brake motor. If the pulse count difference is, say, 5, a pulse width modulated voltage at an 8% duty cycle is applied to the brake motor (actuator) (See TABLE 1, which is a lookup table that is called on by the system controller program to determine the pulse width modulation duty cycle, which results in an averaged voltage from 0 to 100% of the battery voltage). In the presently described embodiment, 100% duty cycle is 6 volts DC. If the resulting braking force slows the spool sufficiently to yield a pulse count difference of 4 or less, the voltage duty cycle goes to 0%. (This sample/response/sample/response cycle loops at about 1 kHz.) If, however, the difference continues to increase during the cast, the PWM duty cycle correspondingly increases. At a difference of 9, the duty cycle is 24% of the system voltage. At a difference of 21 counts, the duty cycle is 72%. If the difference exceeds 22 counts, the corresponding line distance would be approaching a length that could cause backlash, at which point the system is considered to be out of the control range and the full braking voltage is applied and held until either i) the thumb bar is raised or ii) the pulse count difference decreases. If at any time during the cast the thumb bar is raised, as when the reel handle is cranked, the control loop is exited.

TABLE 1

Lookup Table

| Pulse Difference (Pulses) | PWM Duty Cycle | Average Voltage to Actuator (V) | |
|---|---|---|---|
| 0 | 0% | 0 | Range 1 |
| 3 | 0% | 0 | |
| 5 | 10% | 0.6 | Range 2 |
| 7 | 20% | 1.2 | |
| 9 | 27% | 1.62 | |
| 11 | 34% | 2.04 | |
| 13 | 41% | 2.46 | |
| 15 | 50% | 3 | |
| 17 | 60% | 3.6 | |
| 19 | 70% | 4.2 | |
| 21 | 80% | 4.8 | |
| 23 | 100% | 6 | Range 3 |

Note that these differences, PWM duty cycles and min/max points can be varied to obtain optimum response time and casting distance. For example, an onboard LED display with user interface buttons or a GUI could allow the following variables to be adjusted: Maximum allowed line difference, Minimum line distance before applying the minimum braking voltage, Full voltage holding time, PWM curve, etc.

Two rechargeable batteries are used as the power storage system in the current embodiment. One 9V battery powers the control chip. A 6 V battery powers the brake motor. The batteries are charged by a dynamo that is driven by the reel crank as the line is retrieved from the cast.

In alternate embodiments, the power storage system could be various types of conventional batteries (Ni-Cad, Lithium, lead/Acid, Alkaline, rechargeable, etc), or unconventional power storage devices such as flywheel battery, fuel cell, capacitors, or other power storage devices.

In alternate embodiment the power generation system could be auxiliary recharging of batteries, flux charging of batteries, charging a flywheel battery by the reel crank as the line is retrieved, fuel cell, combustible fuel powered generator (butane, etc), and the like.

The fishing reel of the invention may further optionally comprise one or more user interfaces such as, but are not limited to: an on/off switch; a neutral control switch; LCD or other visual display; display of incoming line speed when reeling in; display of line payout length; display of number of casts; display of power storage level; dial or switch or ability to vary level of backlash control incrementally.

What is claimed is:

1. A fishing reel having direct sensing or measurement of line length, as opposed to velocity or acceleration, past two line contact points on the reel, with said line length data being fed back to a comparative control loop which initiates a direct contact spool brake to slow or fully halt spool rotation in order to maximize casting distance while eliminating backlash under all casting conditions.

2. A baitcast fishing reel comprising
   a spool with fishing line;
   a spool sensor in contact with the fishing line on the spool and comprising a first line contact point and a first encoder system that directly measures the length of the fishing line passing the first line contact point;
   a line sensor located away from the spool and comprising a second line contact point and a second encoder system that directly measures the length of fishing line passing the second line contact point;
   a system controller that receives and compares the measurements from the first and second encoder systems and provides a control signal to a brake actuator, the signal being proportional to the difference between the line length measurements of the first and second encoder systems at a particular point in time;
   a spool braking mechanism attached to the spool for directly applying resistance against the free rotation of the spool; and
   a brake actuator responsive to the control signal from the system controller to actuate the spool braking mechanism.

3. A fishing reel according to claim 2 wherein the line sensor is located a short distance from the spool.

4. A fishing reel according to claim 2 wherein the first and second line contact points comprise one or more rollers.

5. A fishing reel according to claim 2 wherein the first and second encoder systems comprise a magnet target wheel and a Hall sensor.

6. A fishing reel according to claim 2 wherein the control signal is control voltage.

7. A fishing reel according to claim 2 wherein the spool braking mechanism is selected from the group consisting of a drum brake system, a disc brake system, an inertial braking system, a mechanical braking system, and any combination of these.

8. A fishing reel according to claim 7 wherein the spool braking mechanism is a drum brake system comprising a drum brake and one or more brake pads.

9. A fishing reel according to claim 2 wherein the brake actuator is selected from the group consisting of a rotary voice coil actuator, a linear voice coil actuator, a servo motor, a stepper, a solenoid, a dc motor, a pneumatic motor, a hydraulic motor, an electric motor, a peizoactuator and a peizomotor.

10. A fishing reel according to claim 9 wherein the brake actuator is a rotary voice coil actuator.

11. A fishing reel according to claim 2 wherein the first line contact point comprises a single roller, the second line contact point comprises pinch rollers through which the fishing line is fed, the first and second encoder systems each comprise a magnet target wheel and a Hall sensor, the line sensor is located on a level wind guide of the reel, the control signal is control voltage, the spool braking mechanism comprises a drum brake and one or more brake pads, and the brake actuator is a rotary voice coil actuator.

12. A method for substantially eliminating backlash when casting a fishing line, the method comprising utilizing the fishing reel of claim 2.

* * * * *